(12) United States Patent
Day et al.

(10) Patent No.: US 8,192,888 B2
(45) Date of Patent: Jun. 5, 2012

(54) TWO LAYER ELECTROLYTE SUPPORTED FUEL CELL STACK

(75) Inventors: Michael J. Day, Dublin, OH (US); Katarzyna Sabolsky, Westerville, OH (US); Todd G. Lesousky, Columbus, OH (US); Matthew M. Seabaugh, Columbus, OH (US)

(73) Assignee: NexTech Materials, Ltd., Lewis Center, OH (US)

( * ) Notice: Subject to any disclaimer, the term of this patent is extended or adjusted under 35 U.S.C. 154(b) by 1173 days.

(21) Appl. No.: 11/109,471

(22) Filed: Apr. 19, 2005

(65) Prior Publication Data
US 2006/0234100 A1    Oct. 19, 2006

(51) Int. Cl.
*H01M 8/12* (2006.01)

(52) U.S. Cl. ........ 429/465; 429/481; 429/482; 429/533; 429/535

(58) Field of Classification Search .................. None
See application file for complete search history.

(56) References Cited

U.S. PATENT DOCUMENTS

| | | | |
|---|---|---|---|
| 3,336,629 A | | 8/1967 | Matsui |
| 5,238,754 A | * | 8/1993 | Yasuo et al. ............... 429/30 |
| 5,591,315 A | | 1/1997 | Mazanec et al. |
| 5,866,275 A | | 2/1999 | Kawasaki |
| 6,200,541 B1 | | 3/2001 | Kleefisch et al. |
| 6,428,920 B1 | * | 8/2002 | Badding et al. ............. 429/30 |
| 6,835,485 B2 | | 12/2004 | Ukai et al. |
| 2002/0076593 A1 | * | 6/2002 | Helfinstine et al. ............ 429/30 |
| 2002/0127455 A1 | * | 9/2002 | Pham et al. .................... 429/33 |
| 2003/0035989 A1 | | 2/2003 | Gorte |
| 2003/0059668 A1 | | 3/2003 | Visco et al. |
| 2003/0232230 A1 | * | 12/2003 | Carter et al. .................. 429/32 |
| 2004/0023101 A1 | | 2/2004 | Jacobson et al. |
| 2004/0115503 A1 | | 6/2004 | Jacobson et al. |
| 2004/0265663 A1 | * | 12/2004 | Badding et al. ............... 429/30 |
| 2005/0061663 A1 | * | 3/2005 | Chen et al. .................. 204/295 |
| 2005/0227133 A1 | | 10/2005 | Gorte |
| 2006/0113034 A1 | | 6/2006 | Seabaugh |
| 2007/0054169 A1 | | 3/2007 | Day |

FOREIGN PATENT DOCUMENTS

| | | |
|---|---|---|
| EP | 0996186 | 4/2000 |
| EP | 0996186 A2 * | 4/2000 |
| EP | 1170812 | 1/2002 |
| EP | 1467421 | 10/2004 |
| JP | 668885 A | 3/1994 |
| JP | 7-69721 | 3/1995 |
| WO | 2005/009730 | 2/2005 |

OTHER PUBLICATIONS

Day et al, U.S. Appl. No. 11/220,361.

* cited by examiner

*Primary Examiner* — Keith Walker
(74) *Attorney, Agent, or Firm* — Porter Wright Morris & Arthur LLP

(57) ABSTRACT

Self-supporting thin film membranes of ceramic materials and related electrochemical cells and cell stacks. The membrane structure is divided into a plurality of self-supporting thin membrane regions by a network of thicker integrated support ribs. The membrane structure may be prepared by laminating a thin electrolyte layer with a thicker ceramic layer that forms a network of support ribs.

14 Claims, 7 Drawing Sheets

⊢⊣ 1.00 cm

⊢⊣ 1.00 cm 1.00 cm 1.00 cm

⊢⊣ 1.00 cm

⊢⊣ 1.00 cm 1.00 cm 1.00 cm

TWO LAYER ELECTROLYTE SUPPORTED FUEL CELL STACK

CROSS-REFERENCE TO RELATED APPLICATIONS

Not applicable

STATEMENT REGARDING FEDERALLY SPONSORED RESEARCH

Not applicable

REFERENCE TO MICROFICHE APPENDIX

Not applicable

FIELD OF THE INVENTION

The invention relates to self-supporting thin film membranes of ceramic materials, electrochemical cells including these thin film membranes, and stacks formed from these electrochemical cells. The disclosed membrane and resultant cell and stack architecture are particularly well suited to applications in which mechanical ruggedness and volumetric and gravimetric reaction density are desirable. This invention may be useful in electrochemical separations and catalytic reactors including but not limited to solid oxide fuel cells and oxygen separation membranes.

BACKGROUND OF THE INVENTION

Tubular solid oxide fuel cells (SOFCs) are the most extensively demonstrated of the many designs proposed for SOFCs. In these structures, a multi-layer tube is fabricated with cathode, electrolyte, and anode layers. Tubes that are supported by anodes, cathodes, and electrolytes each have been proposed in the literature and demonstrated. Electrolyte- and cathode-supported tubes, in both circular and flat tube configurations, have been demonstrated, as have anode-supported tubes.

In tubular SOFCs, fuel or air is flowed down the center of the tube, depending on whether the tube is anode- or cathode-supported, while the complementary gas mix is flowed outside the tube. Such tubes can have open or closed ends and are typically sealed outside the reaction zone of the SOFC. Conventional tubular cells typically suffer from low volumetric or gravimetric power density because large tubes do not pack well and have a low surface area to volume ratio.

Microtubular SOFCs, in which small-diameter (i.e., <5 mm) tubes of electrolyte are slurry coated with cathode and anode components, overcome some of the disadvantages of conventional tubes. Sealing of small diameter microtubes is simpler than sealing of conventional tubes. Microtubular cells also overcome the low surface area to volume ratio associated with conventional tubular cells. However, microtubular cells require complex manifolding and electrical interconnection schemes, which makes scaling to large power stacks difficult.

Planar SOFCs, which may be supported by either the electrode or the electrolyte, also have been demonstrated extensively. Electrode-supported cells have a thick electrode component that provides the mechanical load-bearing member of the cell and a thin electrolyte layer that dramatically reduces electrolyte ohmic resistance in the cell and allows operation at intermediate temperatures (e.g., $T<800°$ C.). Electrode-supported SOFCs typically are produced by co-sintering the support electrode material and a thin coating of electrolyte material. The electrode support is typically tape cast, calendared or slip cast, although other preparation methods have been demonstrated. The thin electrolyte can be deposited in a number of ways, including but not limited to lamination of electrolyte tape, screen printing, calendaring, and spray deposition. Electrode-supported cells preferably have a sintered electrolyte layer that is less than twenty microns in thickness after sintering with the electrolyte layer being well-adhered to the electrode support.

Electrode-supported planar SOFCs include both cathode- and anode-supported cells. Cathode-supported cells have the potential to be lightweight and lower in cost than anode-supported cells. However, processing of cathode-supported cells is difficult because the co-firing of most cathode materials in contact with an electrolyte produces insulating intermediate compounds. Anode-supported electrolytes are perhaps the most widely evaluated cell geometry for low temperature operation. Processing of anode-supported cells is comparatively easy because sintering temperatures in excess of 1300° C. can be used to achieve dense electrolytes without concern for interaction between the anode material and the supported electrolyte.

Planar anode-supported cells are particularly attractive for mass market, cost driven applications because of their high areal power density. Performance of anode-supported cells at 700° C. has been demonstrated to be over 1 $W/cm^2$ in small cells at low fuel utilization. With appropriate seal and interconnect technology, power densities greater than 0.4 $W/cm^2$ have been reported for anode-supported cell stacks. The planar structure also offers the advantage of packing efficiency. However, anode-supported cells are not without drawbacks. When conventional nickel oxide/yttrium stabilized zirconia (NiO/YSZ) composites are used as support materials, the reduction of NiO to nickel metal creates stress in the electrolyte layer, which may cause considerable deformation during this reduction process. Operating planar anode-supported cells at high power density and high fuel utilization also is difficult; the thick porous layer prevents rapid diffusion of steam away from the electrolyte and results in increased cell ASR at high current density.

Alternatively, electrolyte-supported planar cells have an electrolyte layer that provides the mechanical strength of the cell. The electrolyte layer can be produced by tape casting or other methods. Electrodes are typically applied to the electrolyte later by screen printing or spray coating and fired in a second step. To achieve strong electrode adhesion, the ink particle size, composition, and surface area must be tailored to the target firing temperature and controlled during fabrication. Electrodes can be sintered in two separate stages or simultaneously, depending upon the requisite temperatures for the cathode and anode. In many cases, the anode ink is fired first because it is more refractory and more difficult to sinter, and the cathode ink applied and fired in a second step at a lower temperature to minimize the possibility of electrolyte/cathode interaction. Electrolyte-supported cells offer numerous advantages in the production of SOFCs. The sealing of electrolyte-supported cells is expected to be simpler than for electrode-supported planar cells because a dense electrolyte perimeter can be preserved during electrode printing, which provides a dense, smooth surface for sealing operations. Electrolyte-supported cells also have good stability during reduction. Because only a thin layer of anode is affected by the reduction process, this process generally has little impact on cell mechanical stability. Gas diffusion in and out of the thinner anode layer also makes steam diffusion limitation less of a concern.

However, electrolyte-supported cells often exhibit much higher area specific resistance values than electrode-supported cells because the electrolyte typically exhibits lower bulk conductivity than the anode or cathode materials. To compensate for this higher area-specific resistance, the operating temperature for electrolyte-supported cells generally is higher than anode-supported cells using the same materials set. The higher operating temperature of the electrolyte-supported cells can be a drawback, particularly for developers wishing to use metallic interconnect materials.

In spite of more than thirty years of continuous research in the area of SOFCs, these systems remain far from commercialization. Until improved SOFC cell designs are identified that address the shortcomings of existing cell structures, it will be difficult for SOFCS to overcome the commercialization barriers presented by conventional energy production routes. Considering planar cells in particular, a cell that delivers high performance, high mechanical strength, and easier sealing than current electrolyte- or anode-supported cells is essential in providing an avenue for commercialization of SOFCs.

SUMMARY OF THE INVENTION

The present invention provides a mechanically robust ceramic membrane structure. This membrane provides the advantages of both electrolyte-supported cells (a dense sealing perimeter, high mechanical strength, and thin electrode layers that avoid diffusion limitations) and electrode-supported cells (low ohmic contribution of the electrolyte layer and potential for low temperature operation) without the drawbacks of these conventional designs. The membrane is intended for use in electrochemical cells; when appropriate electrode materials are applied to each side of the membrane, the cell may be used as a fuel cell, oxygen separator, or other electrochemical device.

The structure is divided into a plurality of self-supporting thin membrane regions by a network of thicker integrated support ribs. The membrane structure of the present invention may be prepared by laminating a thin electrolyte layer in the green state with a thicker ceramic layer in the green state, with the thicker ceramic layer forming a network of support ribs. The thin electrolyte layer may be prepared by tape casting or other processes that result in a layer having a thickness of less than 100 microns after firing. The thicker support layers may be produced by punching or cutting green sheets produced by tape casting; by conventional casting methods including but not limited to slip casting or gel casting; by dry or semi-dry pressing using isostatic or uniaxial presses; or by printing the pattern by solid freeform fabrication or similar high solids extrusion processes. The thin electrolyte layers are laminated to the thicker support layers.

The preferred method of lamination, described herein, is the use of pressure and temperature to bond the two layers by heating the green ceramic tape above the glass transition temperature of the polymer component to achieve intimate contact and bonding between the layers. The membrane and support layers are compressed at temperatures below 100° C. to produce a laminate structure. The laminates are heated to ~600° C. to remove the polymeric binder. The resultant structure is sintered at temperatures above 1000° C. to densify the structure and provide adherence and cohesion layers.

The architecture of electrochemical cells utilizing the ceramic membranes of the present invention offer advantages in processing and mechanical integrity compared with conventional electrode-supported cells. This architecture also provides a means of translating the advantages of thin electrolytes to a robust electrolyte-supported design.

The laminate structure of the present invention also provides a uniquely flexible platform for the design of a range of electrochemical cells by the selection of appropriate electrode screen printing inks. The simple planar geometry of the cell also allows the use of current carrying electrode materials and processes developed for both electrode- and electrolyte-supported cells. The membranes and cells of the present invention are particularly well-suited to large volume manufacturing and low cost processes.

The disclosed electrolyte-supported structure is textured by the support on at least one side. Preferably, the anode is deposited onto a textured side of the structure and the cathode is deposited on the opposing side.

The large seal perimeter of the present invention also is particularly well suited for stack fabrication. Fuel cell stacks can be produced by interleaving electrochemical cells formed using disclosed structure with dense interconnect plates. The interconnect plates separate the air and fuel streams while providing an electrical series connection between the cells. The strength and flexibility of the proposed cell design makes the cells amenable to achieving cell-to interconnect conformance during stack assembly by applying small compressive forces; good contact along the perimeter improves stack sealing while good area contact between the cells and the interconnect reduces stack resistance.

The present invention encompasses a self-supporting thin-film ceramic membrane, an electrochemical cell, and an electrochemical cell stack. In a preferred embodiment, a self-supporting ceramic membrane comprises a thin electrolyte layer in the green state and a thicker support layer in the green state, with the thicker support layer defining a plurality of voids separated by a network of support ribs. Each layer comprises at least one sheet of a ceramic electrolyte material; the thicker support layer preferably comprises at least two sheets of a ceramic electrolyte material laminated together. The thin electrolyte layer is laminated to the thicker support layer and then sintered to form a composite structure having a textured surface at least on the support layer side. The sintered thin electrolyte layer preferably has a thickness less than 100 microns. The thin electrolyte layer and the thicker support layer may be selected from a partially stabilized zirconia composition, preferably a scandia-stabilized zirconia composition, more preferably a 6 mol % scandia-stabilized zirconia composition. The thicker support layer preferably comprises a polymeric component, such that the thin and thicker layers are laminated together by heating the layers to a temperature greater than the glass transition temperature of the polymer component.

In another embodiment, the self-supporting ceramic membrane may comprise a thin electrolyte layer in the green state and a thicker support layer in the green state, with the thicker support layer defining an integral central mesh portion. Each of the layers comprises at least one sheet of a ceramic electrolyte material. The thin electrolyte layer is laminated to the thicker support layer and then sintered to form a composite structure. In yet another embodiment, the self-supporting ceramic membrane comprises a thin electrolyte layer including a stack of at least two sheets of a scandia-stabilized zirconia composition in the green state and a thicker support layer comprising a laminate of at least two sheets of a partially stabilized zirconia composition in the green state, the sheets including a polymeric component and defining a plurality of voids separated by a network of support ribs. The thin electrolyte layer is laminated to the thicker support layer by heating the layers to a temperature greater than the glass transition temperature of the polymeric component. The layers are then sintered to form a composite structure having a textured surface at least on the support layer side, with the sintered thin electrolyte layer having a thickness less than 100 microns.

The present invention also comprises an electrochemical cell. In one preferred embodiment, the electrochemical cell comprises a self-supporting thin-film ceramic membrane comprising a thin electrolyte layer in the green state and a thicker support layer in the green state, the support layer defining a plurality of voids separated by a network of support ribs. The thin electrolyte layer is laminated to the thicker support layer and then sintered to form a composite structure having a textured surface at least on the support layer side. An anode material is applied to a textured surface of the composite structure and a cathode material is applied to the opposing surface of the composite structure. The anode material may be selected from a composite NiO/Gd-doped cerium oxide and mixtures thereof and the cathode material may be is selected from a Sr-doped lanthanum manganite/Gd-doped ceria composite, a doped lanthanum ferrite composite, and mixtures thereof.

In another preferred embodiment, the electrochemical cell comprises a self-supporting thin film ceramic membrane, with the membrane comprising a thin electrolyte layer comprising at least one sheet of a scandia-stabilized zirconia composition in the green state and a thicker support layer comprising at least one sheet of a partially stabilized zirconia composition in the green state. The thicker support layer includes a polymeric component and defines a plurality of voids separated by a network of support ribs. The thin electrolyte layer is laminated to the thicker support layer by heating the layers to a temperature greater than the glass transition temperature of the polymeric component and then sintered to form a composite structure having a textured surface at least on the support layer side. The sintered thin electrolyte layer preferably has a thickness less than 100 microns. An anode material is applied to a textured surface of the composite structure and a cathode material is applied to the opposing surface of the composite structure. The anode material may be selected from a composite NiO/Gd-doped cerium oxide and mixtures thereof and the cathode material may be selected from a Sr-doped lanthanum manganite/Gd-doped ceria composite, a doped lanthanum ferrite composite, and mixtures thereof.

The invention also includes an electrochemical cell stack. In a preferred embodiment the electrochemical cell stack comprises a first dense electronically conductive plate; a first electrochemical cell as described above with its anode surface secured to the first conductive plate; a second dense electronically conductive plate secured to the cathode surface of the first electrochemical cell; a second electrochemical cell as described above with its anode surface secured to the opposing surface of the second conductive plate; and a third dense electronically conductive plate secured to the cathode surface of the second electrochemical cell. The sintered thin electrolyte layer preferably has a thickness less than 100 microns. The anode material may be selected from a composite NiO/Gd-doped cerium oxide and mixtures thereof and the cathode material may be selected from a Sr-doped lanthanum manganite/Gd-doped ceria composite, a doped lanthanum ferrite composite, and mixtures thereof.

In another preferred embodiment, the electrochemical cell stack comprises n electrochemical cells as described above, wherein $n \geq 2$; and n+1 dense electronically conductive plates each selected from a nickel chrome superalloy, a ferritic stainless steel, and a lanthanum chromite. Each of n−1 plates is secured between the anode surface of one of the n electrochemical cells and the cathode surface of another one of the n electrochemical cells and each of the remaining 2 plates is secured to an outer surface of one of the outermost of the n electrochemical cells. The anode material may be selected from a composite NiO/Gd-doped cerium oxide and mixtures thereof and the cathode material maybe selected from a Sr-doped lanthanum manganite/Gd-doped ceria composite, a doped lanthanum ferrite composite, and mixtures thereof.

In yet another preferred embodiment, the electrochemical cell stack comprises a first dense electronically conductive ceramic plate; a first bi-layer assembly comprising a thin electrolyte layer in the green state and a thicker support layer in the green state, with the support layer defining a plurality of voids separated by a network of support ribs. The support layer of the first bi-layer assembly is positioned adjacent to the first conductive plate and a second dense electronically conductive ceramic plate is positioned adjacent to the thin electrolyte layer of the first bi-layer assembly. A second bi-layer assembly, identical to the first bi-layer assembly, has its support layer positioned adjacent to the opposing surface of the second conductive plate. A third dense electronically conductive ceramic plate is positioned adjacent to the thin electrolyte layer of the second bi-layer assembly. The layered assembly is laminated and then sintered to form a composite structure. An anode material is applied to the support layers of the composite structure and a cathode material is applied to the thin electrolyte layers of the composite structure. The anode material may be selected from a composite NiO/Gd-doped cerium oxide and mixtures thereof and the cathode material may be selected from a Sr-doped lanthanum manganite/Gd-doped ceria composite, a doped lanthanum ferrite composite, and mixtures thereof. Each of the dense electronically conductive ceramic plates may be selected from a lanthanum chromite.

In yet another preferred embodiment, the electrochemical cell stack, comprises n bi-layer assemblies wherein $n \geq 2$, with each of the bi-layer assemblies comprising a thin electrolyte layer in the green state and a thicker support layer in the green state, with the support layer defining a plurality of voids separated by a network of support ribs; and n+1 dense electronically conductive ceramic plates, each of n−1 plates being secured between the support layer of one of the n bi-layer assemblies and the thin electrolyte layer of another one of the n bi-layer assemblies and each of the remaining 2 plates being secured to an outer surface of one of the outermost of the n bi-layer assemblies. The layered assembly is laminated and then sintered to form a composite structure. An anode material is applied to the support layers of the composite structure and a cathode material being applied to the thin electrolyte layers of the composite structure. The anode material may be selected from a composite NiO/Gd-doped cerium oxide and mixtures thereof and the cathode material may be selected from a Sr-doped lanthanum manganite/Gd-doped ceria composite, a doped lanthanum ferrite composite, and mixtures thereof. Each of the dense electronically conductive ceramic plates may be selected from a lanthanum chromite.

The present invention also encompasses methods of making a self-supporting thin-film ceramic membrane, an electrochemical cell, and an electrochemical cell stack. In a preferred embodiment, the method of making a self-supporting ceramic membrane comprising the steps of providing a thin electrolyte layer comprising at least one sheet of a ceramic electrolyte material in the green state; providing a thicker support layer comprising at least one sheet of a ceramic electrolyte material in the green state, with the thicker support layer defining a plurality of voids separated by a network of support ribs; laminating the thin electrolyte layer to the thicker support layer; and sintering the laminated layers to form a composite structure having a textured surface at least on the support layer side.

In a preferred embodiment the method of making an electrochemical cell comprises the steps of providing a self-supporting ceramic membrane prepared using the steps described above; applying an anode material to a textured surface of the composite structure; and applying a cathode material to the opposing surface of the composite structure. The method also may comprise the steps of providing an anode material selected from a composite NiO/Gd-doped cerium oxide and mixtures thereof; and providing a cathode material selected from a Sr-doped lanthanum manganite/Gd-doped ceria composite, a doped lanthanum ferrite composite, and mixtures thereof.

In a preferred embodiment, a method of making an electrochemical cell stack comprises the steps of providing n electrochemical cells prepared using the steps described above, wherein n≧2; providing n+1 dense electronically conductive plates each selected from a nickel chrome superalloy, a ferritic stainless steel, and a lanthanum chromite; securing each of n−1 plates between the anode surface of one of the n electrochemical cells and the cathode surface of another one of the n electrochemical cells; and securing each of the remaining 2 plates to an outer surface of one of the outermost of the n electrochemical cells. The method may further comprise the steps of selecting an anode material from a composite NiO/Gd-doped cerium oxide and mixtures thereof; and selecting a cathode material from a Sr-doped lanthanum manganite/Gd-doped ceria composite, a doped lanthanum ferrite composite, and mixtures thereof.

In another preferred embodiment, a method of making an electrochemical cell stack comprises the steps of providing n bi-layer assemblies wherein n≧2, with each of the bi-layer assemblies comprising a thin electrolyte layer in the green state and a thicker support layer in the green state, with the thicker support layer defining a plurality of voids separated by a network of support ribs; providing n+1 dense electronically conductive ceramic plates; securing each of n−1 plates between the support layer of one of the n bi-layer assemblies and the thin electrolyte layer of another one of the n bi-layer assemblies; securing each of the remaining 2 plates to an outer surface of one of the outermost of the n bi-layer assemblies; laminating the layered assembly; sintering the laminated assembly to form a composite structure; applying an anode material to the support layers of the composite structure; and applying a cathode material to the thin electrolyte layers of the composite structure. The method may further comprise the steps of selecting an anode material from a composite NiO/Gd-doped cerium oxide and mixtures thereof; and selecting a cathode material from a Sr-doped lanthanum manganite/Gd-doped ceria composite, a doped lanthanum ferrite composite, and mixtures thereof. The method also may comprises the step of selecting each of the dense electronically conductive ceramic plates from a lanthanum chromite.

BRIEF DESCRIPTION OF THE DRAWINGS

These and further objects of the invention will become apparent from the following detailed description.

DETAILED DESCRIPTION OF CERTAIN PREFERRED EMBODIMENTS

Figure 1:
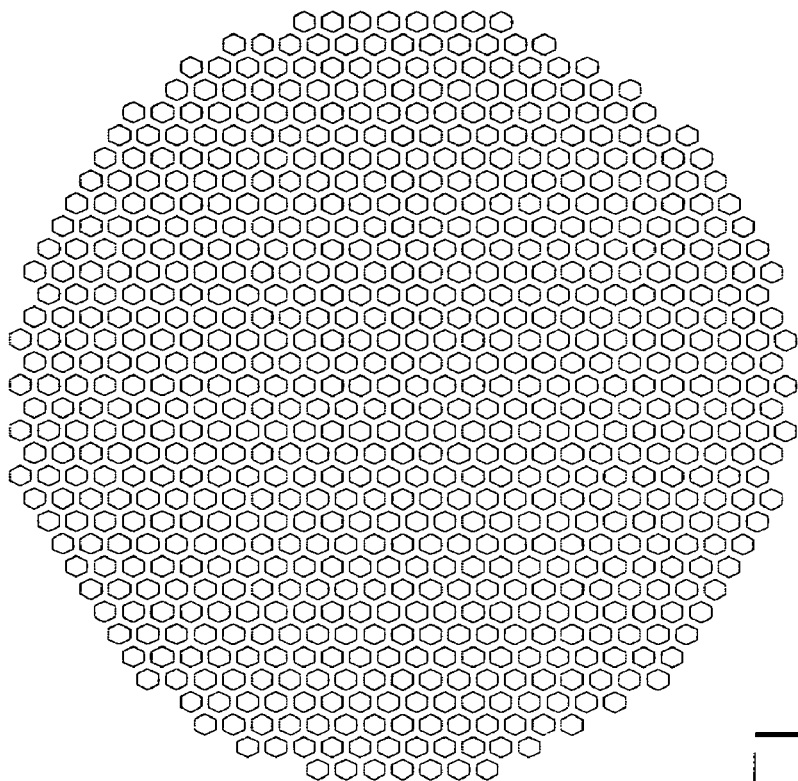
FIG. 1 is a cutting pattern for the support structure of the electrochemical cell of Example 1.

The present invention provides a membrane structure intended for use in electrochemical cells. When appropriate electrode materials are applied to each side of the membrane, the membrane may form a fuel cell, oxygen separator, or other electrochemical device. The resultant electrochemical cells may be assembled into stacks.

The membrane structure of the present invention is divided into a plurality of self-supporting thin membrane regions by a network of thicker integrated support ribs. This membrane offers the advantages of both electrolyte-supported cells (a dense sealing perimeter, high mechanical strength, and thin electrode layers that avoid diffusion limitations) and electrode-supported cells (low ohmic contribution of the electrolyte layer and potential for low temperature operation) without the drawbacks of these conventional designs.

The membrane structure comprises a thin electrolyte layer laminated to a thicker layer of a ceramic material that defines a plurality of voids separated by an interconnecting network of support ribs. The ratio of the thickness of the thin electrolyte layer to the support layer preferably is 1:10. The laminate generally is textured by the support on one side and smooth on the other side, although the laminate may be constructed to have two textured surfaces if desired. As explained further below, application of the anode to a textured surface is expected to improve thermo-mechanical stability during operation.

Each layer may comprise one or more sheets of a ceramic electrolyte material in the green state. Any number of sheets may be used to achieve the desired thickness of each electrolyte layer. The use of multiple sheets in each layer generally is preferred to minimize the risk of critical continuous defects (e.g., pinholes) through an electrolyte layer. The use of multiple sheets in the support layer also may be advantageous because it allows the use of sheets of dissimilar composition for building a composite support layer or functionally grading the support structure to achieve compatibility with a dissimilar electrolyte layer.

A pattern of ribs separated by voids is formed in the support layer. The ratio of void area to rib area preferably is >70/30. The ribs preferably have a substantially uniform thickness, generally in the range of 30-300 microns. The voids may define substantially identical shapes or may vary in size and/or shape across a cell to improve overall void packing density. Preferably, the voids define regular polygons, although voids defining circles and other shapes also may be used. Hexagonal voids are particularly preferred because they reduce high angle stress raisers and provide a strong support and high void packing density. In a preferred embodiment, a cross section of the mesh support layer in a plane parallel to the thin electrolyte layer defines a honeycomb-like structure, which provides excellent access to the dense thin electrolyte layer.

Preferably, the thin electrolyte layer and the thicker support layer each is selected from a partially stabilized zirconia composition, preferably a scandia-stabilized zirconia composition, more preferably, a 6 mol % scandia-stabilized zirconia composition. Other composition, including but not limited to doped cerium oxides, dopes zirconium oxides, lanthanum gallates, bismuth oxide ceramics, other ionic or mixed conducting ceramics, or mixtures of the above, also may yield satisfactory results. The composition of the thin electrolyte layer and the thicker support layer may differ provided the shrinkage upon thermal processing is similar and no deleterious chemical reactions occur between the respective layers. In some cases, for example, it may be preferred to have a mechanically strong poor conductor supporting a mechanically weaker excellent conductor. The thicker support layer includes a polymeric component that adheres the thin and thicker layers together during lamination.

The thin electrolyte layer may be prepared by tape casting or other processes that yield a sheet or stack of sheets having a thickness of less than 100 microns after firing. Preferably, the thin electrolyte layer comprises a stack of at least two-sheets in the green state.

The thicker support layer may be produced by punching or cutting green sheets produced by tape casting; by conventional casting methods including but not limited to slip casting or gel casting; by dry or semi-dry pressing using isostatic or uniaxial presses; or by printing the pattern by solid free-form fabrication or similar high solids extrusion processes. It also may be possible to produce voids in the thicker support layer by the burn-off of fugitive materials contained within the support layer. For tape cast sheets, the support layer preferably comprises a stack of at least two sheets, although single sheets and more than two sheets (e.g., three and four sheets) also may be used. Multiple sheets may be laminated, e.g., at 80° C. and 12 MPa. The laminated may then be cut using a laser cutting system or similar device to form a network of interconnected ribs separated by voids. This may be accomplished, for example, by taking our the laminate and placing it on an aluminum honeycomb table inside a laser cutter. A pattern, such as the hexagonal pattern shown in FIG. 1, may be cut into the laminate, for example, using a 30 W laser set at 50% power and 8-% speed. The pattern includes an uncut perimeter area to allow effective sealing with the thin electrolyte layer and any plates used to form stacks. The cut-out laminate may then be set aside.

Figure 2:
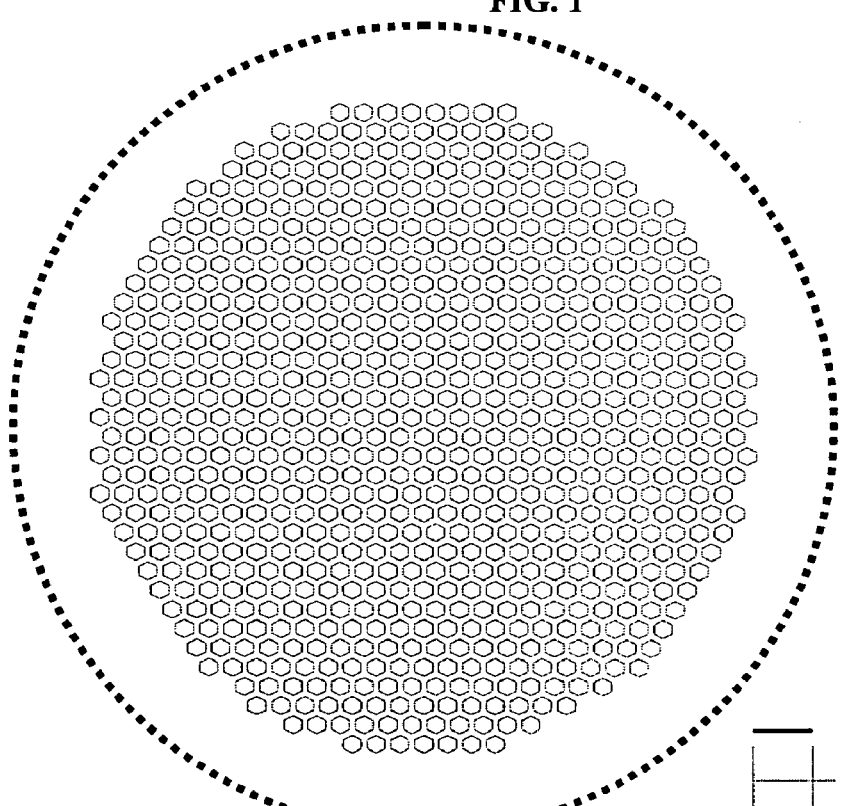
FIG. 2 is the final cutting pattern (dashed line) of the electrochemical cell of the Example 1.

The membrane of the present invention may be prepared by laminating the thin electrolyte layer in the green state to the thicker void-containing support layer in the green state. The preferred lamination method uses pressure and temperature to bond the two layers by heating above the glass transition temperature of the polymer component of the green support layer to achieve intimate contact and bonding between the layers. The thin and thick layers typically are compressed at temperatures below 100° C. to produce a laminate structure. For example, the two-sheet stack of electrolyte tape may be placed on an aluminum setter covered with Mylar. The cut-out support laminate may be placed on top of the electrolyte and covered with another piece of Mylar. The set-up may be enclosed in a heat sealable polyester bag and vacuum sealed. The vacuum sealed bay may be laminated at 80° C. and 12 MPa. After the bag and the enclosed set-up cooled, the laminate may be taken out and place on an alumina honeycomb table inside a laser cutter. A pattern, such as that shown in FIG. 2, may be cut out of the laminate, e.g., using a 30 W laser set at 50% power and 80% speed, leaving a sealing border of about 1.1-1.6 cm around the pattern of shapes. The laminate is then heated to ~600° C. to remove the polymeric binder. The resultant structure is sintered at temperatures above 1000° C. to densify the structure and provide adherence and cohesion layers.

Electrochemical cells may be prepared from the laminate membrane structure of the present invention by applying electrode materials to each side of the membrane. This may be accomplished, for example, by screen printing of electrode inks or other convention electrode application methods. The anode material may be selected from a composite NiO/Gd-doped cerium oxide and mixtures thereof. The cathode material may be selected from a Sr-doped lanthanum manganite/Gd-doped ceria composite, a doped lanthanum ferrite composite, and mixtures thereof.

The anode preferably is deposited onto the textured side of the structure and the cathode is deposited on the smooth, planar side. Anode structures typically experience greater thermo-mechanical loads than cathodes because of the differential of thermal expansion with typical electrolyte materials. It is expected that the relief of the textured surface of the anode will improve thermo-mechanical stability during operation. More specifically, ceramic composite materials such as NiO/YSZ used as the anode material in many fuel cells undergo significant changes in density, thermal expansion, and plasticity as the NiO phase is reduced to form Ni metal during cell operation. These changes result in mechanical stresses and distortions of the anode layer microstructure. The textured side of the cell provides more surface features for anode layer adherence, which is expected to result in less delamination and detachment during anode reduction. In addition, anode material possess greater bulk conductivity that most cathode materials, so breaks or discontinuities from the convolutions of the textured side of the cell are unlikely to isolate anode regions.

A typical anode electrode is produced by depositing an anode interlayer ink, such as a NiO and a gadolinium-doped ceria powder mixture dispersed in an organic vehicle, and then depositing a second ink layer of NiO and yttrium-stabilized zirconia on top of the interlayer. The second layer serves as a high conductivity "current collector" layer. The layers preferably are deposited by applying the ink formulations using a sponge roller or other conventional application method, including but not limited to aerosol spray deposition, screen printing, brush paining, and stencil or transfer printing processes. After sequentially depositing and drying the two layers, the electrode is sintered to a temperature of 1300° C.

Because the cathode side generally is smooth, screen printing a preferred method of cathode deposition, although other conventional methods may be used. A typical cathode electrode is prepared by depositing a first layer of an ink, such as a lanthanum manganite/gadolinium-doped ceria powder mixture dispersed in an organic vehicle, and then depositing a second ink layer of a pure LSM "current collector." After sequentially printing and drying the two layers, the cathode is sintered at a temperature of 1150° C.

Electrochemical cell stacks may be prepared from the resulting electrochemical cells by interleaving the cells with conventional dense interconnect plates of an electrically conducting material. The dense plates serve to separate air and fuel streams while providing an electrical series connection between the cells. The plates may be formed from a dense material that is conductive in both oxidizing and reducing atmospheres, including but not limited to a lanthanum chromite, a nickel chromic superalloy, and a ferritic stainless steel.

An electrochemical stack maybe formed from a minimum of two self-supporting membranes or electrochemical cells and three plates, with the first plate having an inner face adjacent to the support side of the first membrane or cell, the second plate having one face adjacent to the thin electrolyte side of the first membrane or cell and the opposing face adjacent to the support side of the second membrane or cell, and the third plate having an inner face adjacent to the thin electrolyte side of the second membrane or cell. Additional units may be added to the stack with the number of membranes or cells being equal to n and the number of plates being equal to n+1.

When the plates are a metallic material, a stack may be prepared by connecting the membranes or cells to the plates with a contact paste. The contact paste may comprise a conducting ceramic material such as a lanthanum chromite, a cermet such as NiO/YSZ, or a metal, such as platinum or silver. When the plates are a dense ceramic material, a stack may be prepared by stacking as described above. Alternatively, a co-sintered stack may be produced by stacking unfired bi-layer membrane components and interconnect plates as described above. The multi-component layers could then be warm-pressed to achieve a ceramic monolith and co-fired to produce an all-ceramic stack. The anode and cathode materials for the stack can be subsequently applied to the electrolyte laminates after the initial sintering step. The appropriately coated cells are then heat treated at a temperature below the initial firing temperature.

The large seal perimeter allows effective stack sealing with the application of small compressive forces. The flexibility and strength of the membrane allows effective contact between the cells and the interconnect plates to reduce stack resistance.

Example 1

Preparation of Cell Architecture I

The bi-layers were constructed with cast tapes prepared with 6 mol % scandium stabilized zirconia powder (initial SSA=8.704 m$^2$/g). The 6ScSZ tapes for the support structure were prepared by conventional two-step tape casting method. In the first step, the powder (61.27 wt % based on total slurry weight) was milled in a solvent system (1:1 ratio of xylene and ethanol) with 1 wt % dispersant (Richard E. Mistler, Inc., DZ3) for 4 hours. In the second step, the binder and plasticizers were added in following weight percents based on 6ScSZ powder content: 3.18 wt % poly(butylbenzyl phthalate) (Richard E. Mistler, Inc., PBBP), 3.18 wt % poly(alkylene glycol) (Richard E. Mistler, Inc., PPAG), and 6.45 wt % poly(vinyl butyral) (Richard E. Mistler, Inc., B-98). The bottle was resealed and placed on the mill for 12 hours. The milled slurry was then de-aired prior to casting. The slurry was cast onto Mylar with doctor blade height set at 300 μm. The thickness of the dry tape was 90 μm. The tape was cut into 15×15 cm sheets. The sheets were stacked on top each other, two sheets per stack. The resulting two-sheet stack was laminated at 80° C. and 12 MPa. The laminate was then taken out and a pattern shown in FIG. 1 was cut in the laminate using a laser cutting system. The cut-out laminate was set aside.

The 6ScSZ electrolyte tapes for the thin electrolyte layer were prepared by a conventional two-step tape casting method. In the first step, the powder (61.27 wt % based on total slurry weight) was milled in a solvent system (1:1 ratio of xylene and ethanol) with 1 wt % dispersant (Richard E. Mistler, Inc., DZ3) for 4 hours. In the second step, the binder and plasticizers were added in following weight percents based on 6ScSZ powder content: 3.18 wt % poly(butylbenzyl phthalate) (Richard E. Mistler, Inc., PBBP), 3.18 wt % poly(alkylene glycol) (Richard E. Mistler, Inc., PPAG), and 6.45 wt % poly(vinyl butyral) (Richard E. Mistler, Inc., B-98). The bottle was resealed and replaced on the mill for 12 hours. The milled slurry was then de-aired prior to casting. The slurry was cast onto silicone-coated Mylar with doctor blade height set at 50 μm. The thickness of the dry tape was 25 μm. The tape was cut into 15×15 cm sheets. The sheets were stacked on top each other, two sheets per stack.

For lamination of the support structure, the two-sheet stack of electrolyte tape was placed on an aluminum setter covered with Mylar. The cut-out support laminate was placed on top of the electrolyte and covered with another piece of Mylar. The set-up was enclosed in heat sealable polyester bag and vacuum sealed. The vacuum sealed bag was laminated at 80° C. and 12 MPa. After the bag and the enclosed set-up cooled to room temperature, the laminate was taken out. The final part was cut out of the laminate based on the pattern shown by the solid line in FIG. 2.

Example 2

Preparation of Cell Architecture II

Figure 3:
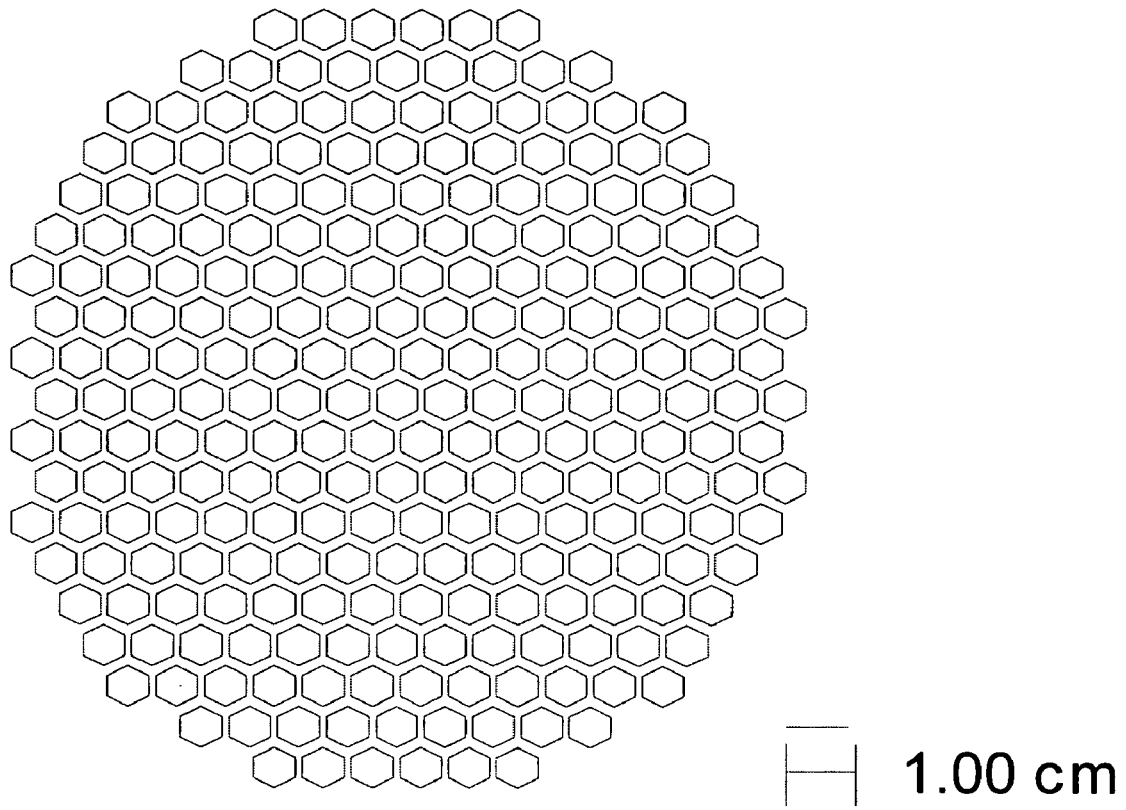
FIG. 3 is a cutting pattern for the support structure of the electrochemical cell of Example 2.
Figure 4:
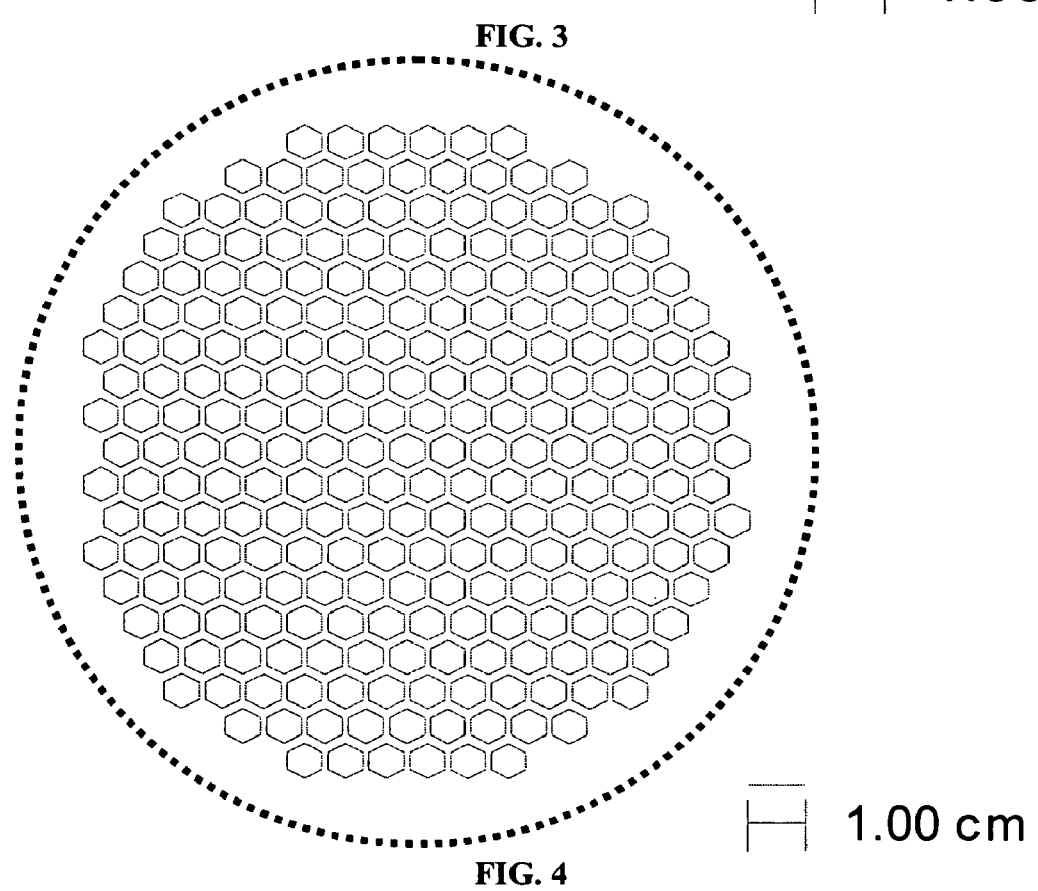
FIG. 4 is the final cutting pattern (dashed line) of the electrochemical cell of Example 2.

The support and electrolyte bi-layers were prepared, cast, and laminated as described in Example 1. The support laminate was laser cut to produce the pattern shown in FIG. 3. The cut-out laminate was set aside. The electrolyte stack was prepared and the two-sheet stack of electrolyte tape was laminated with the cut-out support, also as described in Example 1. The final part was cut out of the resulting laminate using the pattern shown by the solid line in FIG. 4.

Example 3

Preparation of Cell Architecture III

Figure 5:
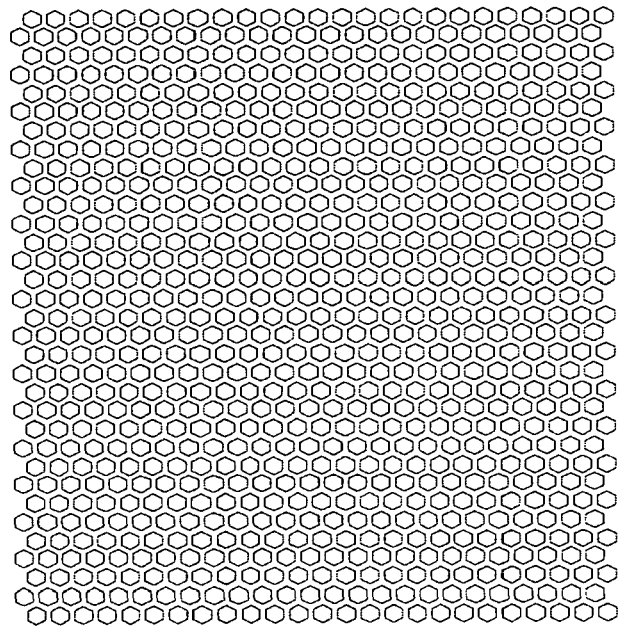
FIG. 5 is a cutting pattern for the support structure of the electrochemical cell of Example 3.
Figure 6:
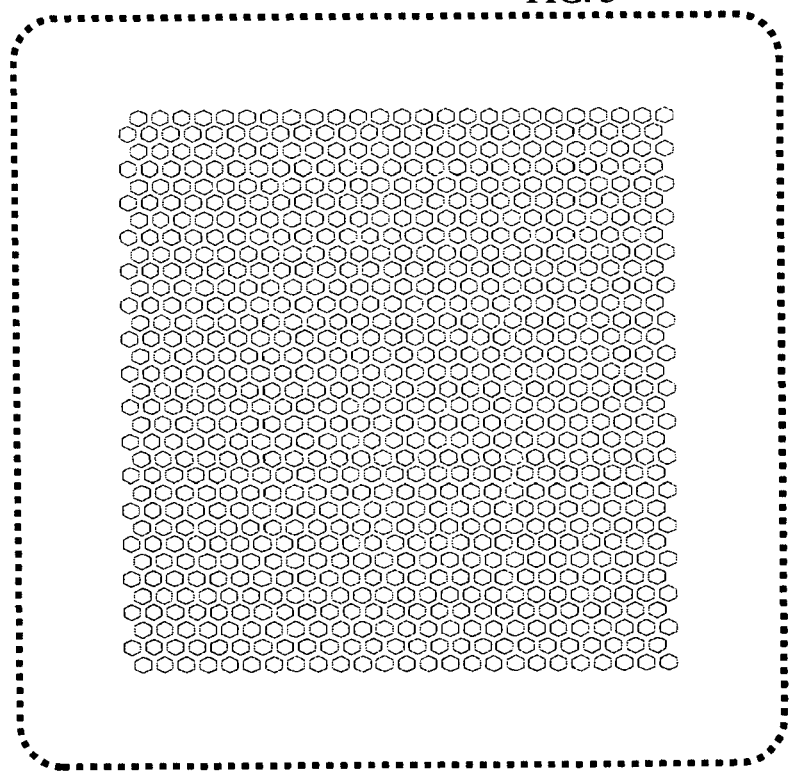
FIG. 6 is the final cutting pattern (dashed line) of the electrochemical cell of Example 3.

The support and electrolyte bi-layers were prepared, cast and laminated as described in Example 1. The support laminate was laser cut to produce the pattern shown in FIG. 5. The cut-out laminate was set aside. The electrolyte stack was prepared and the two-sheet stack of electrolyte tape was laminated with the cut-out support, also as described in Example 1. The final part was cut out of the laminate using the pattern shown by the solid line in FIG. 6.

Example 4

Preparation of Cell Architecture IV

Figure 7:
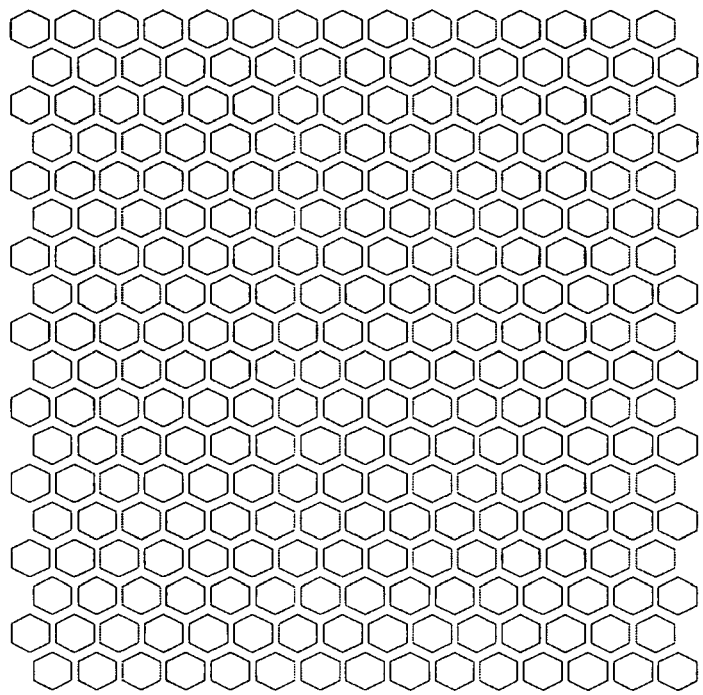
FIG. 7 is a cutting pattern for the support structure of the electrochemical cell of Example 4.
Figure 8:
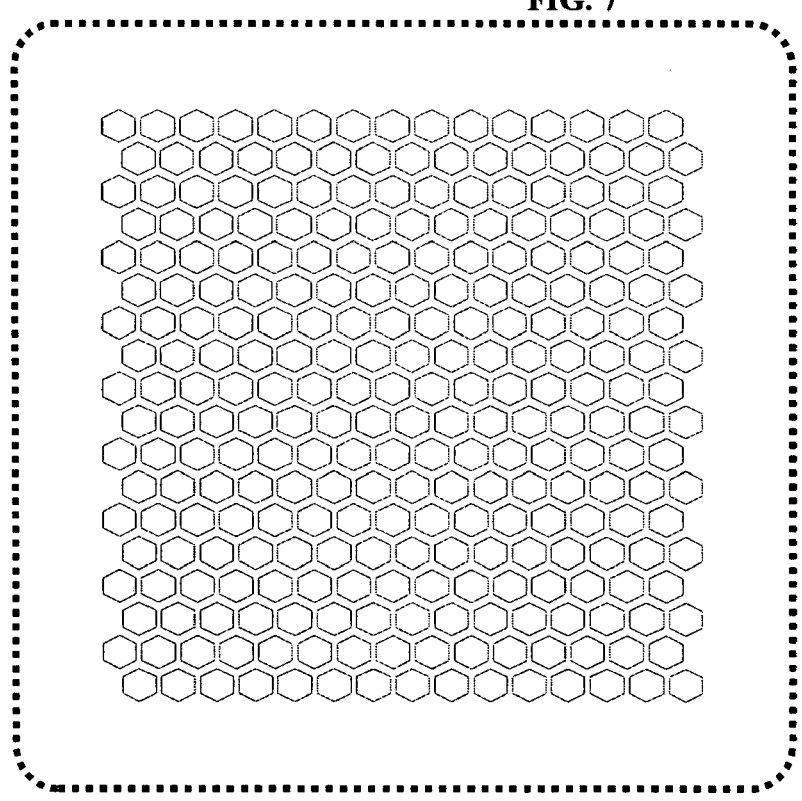
FIG. 8 is the final cutting pattern (dashed line) of the electrochemical cell of Example 4.

The support and electrolyte bi-layers were prepared, cast and laminated as described in Example 1. The support laminate was laser cut to produce the pattern shown in FIG. 7. The cut-out laminate was set aside. The electrolyte stack was prepared and the two-sheet stack of electrolyte tape was laminated with the cut-out support, also as described in Example 1. The final part was cut out of the laminate using the pattern shown by the solid line in FIG. 8.

Example 5

Preparation of Cell Architecture V

Figure 9:
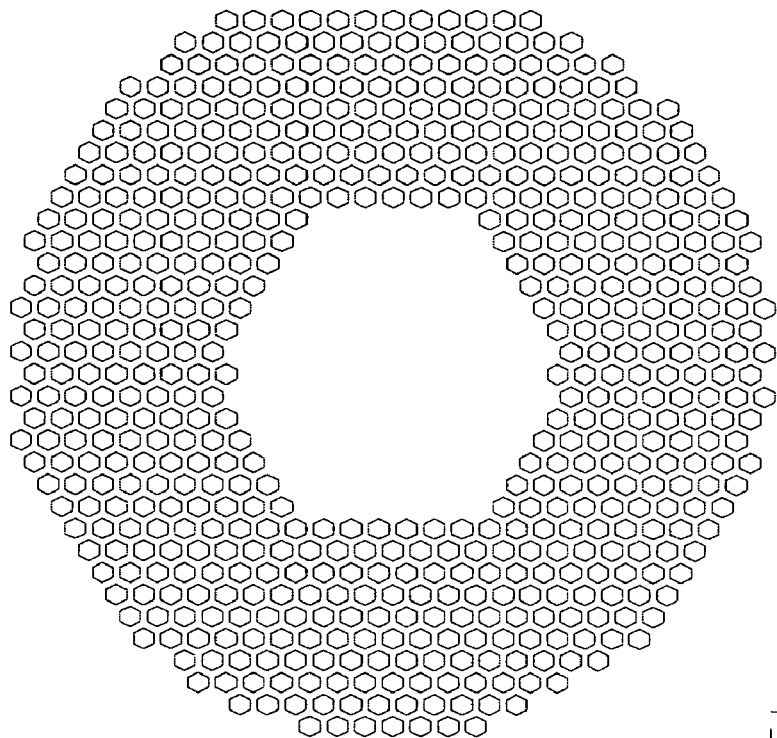
FIG. 9 is a cutting pattern for the support structure of the electrochemical cell of Example 5.
Figure 9:
Figure 10:
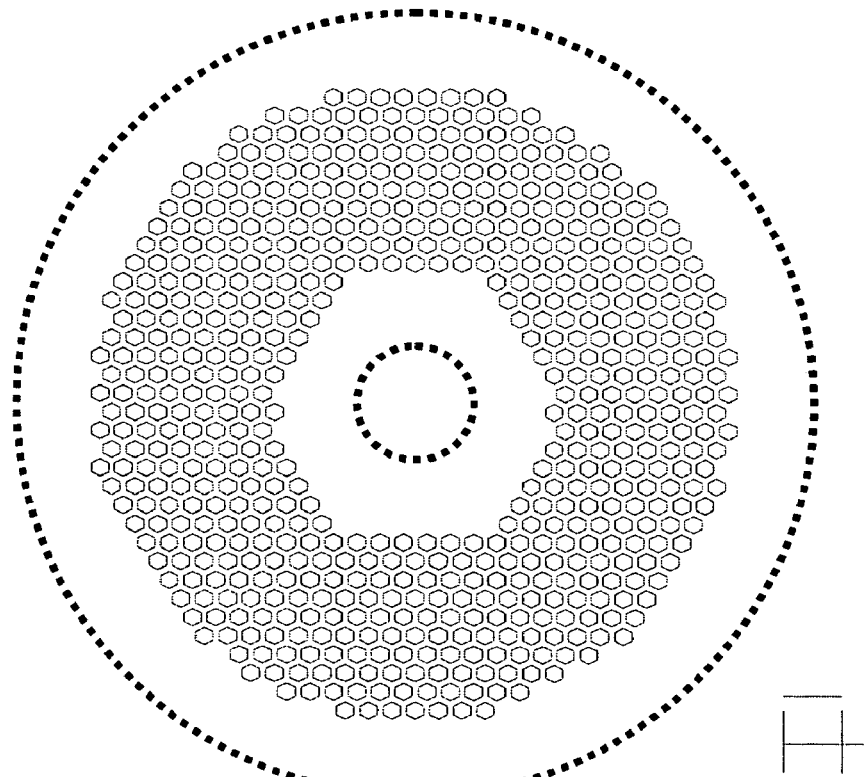
FIG. 10 is the final cutting pattern (dashed line) of the electrochemical cell of Example 5.
Figure 10:

The support and electrolyte bi-layers were prepared, cast and laminated as described in Example 1. The support laminate was laser cut to produce the pattern shown in FIG. 9. The cut-out laminate was set aside. The electrolyte stack was prepared and the two-sheet stack of electrolyte tape was laminated with the cut-out support, also as described in Example 1. The final part was cut out of the laminate using the pattern shown by the solid line in FIG. 10.

Electroding and Testing of Mesh-Supported Cell

A test cell was prepared using an electrolyte prepared as described in Example 1. A composite NiO/Gd-doped ceria anode was applied to the textured side of the electrolyte membrane using a foam roller (in a 7 cm by 4 cm rectangle) and sintered at 1300° C. Subsequently, a Sr-doped lanthanum manganite/Gd-doped ceria composite cathode was applied by paint roller on the untextured side of the electrolyte membrane directly opposite the sintered anode. The cathode was sintered at 1100° C. to achieve good adherence. Platinum meshes were attached to the anode side of the cell using an NiO ink to serve as the anode current collector. Silver mesh was attached to the cathode side of the cell using a Sr-doped lanthanum manganite ink to serve as the cathode current collector. Alumina felt seals were cut to form a perimeter 1.5 cm wide that enclosed the anode and cathode active areas. The alumina felts were saturated with an aqueous slurry of alumina powder to improve the density of the seal material and prevent gas leakage.

The cells was heated to 850° C. under air on the cathode side and nitrogen gas on the anode side. The cell exhibited a high open circuit voltage in N2 and was subsequently reduced by substituting hydrogen for nitrogen in the anode gas stream over a on-hour period. At the end of the reduction process, the cell was initially fed 350 sccm $H_2$ to the anode side and 1.6 slpm air to the cathode side. A measurement of the cell voltage as a function of current density was taken and the data plotted in FIG. 11. The cell as cooled to 825° C. and the voltage measured as a function of current density for various fuel dilutions. The slope of the voltage vs. current density curve was calculated and divided by the active area of the cell to determine the area specific resistance (ASR) of the cell, as shown in Table 1.

TABLE 1

| Temp (° C.) | $H_2$ Flow (sccm) | $N_2$ Flow (sccm) | Air Flow (slpm) | Current at 0.5 V (A) | ASR |
|---|---|---|---|---|---|
| 850 | 350 | 0 | 1.5 | 32.0 | 0.45 |
| 825 | 350 | 0 | 1.5 | 28.5 | 0.51 |
| 825 | 200 | 100 | 1.5 | 23.3 | 0.56 |
| 825# | 225 | 150 | 1.5 | 25.0 | 0.53 |

Figure 11:
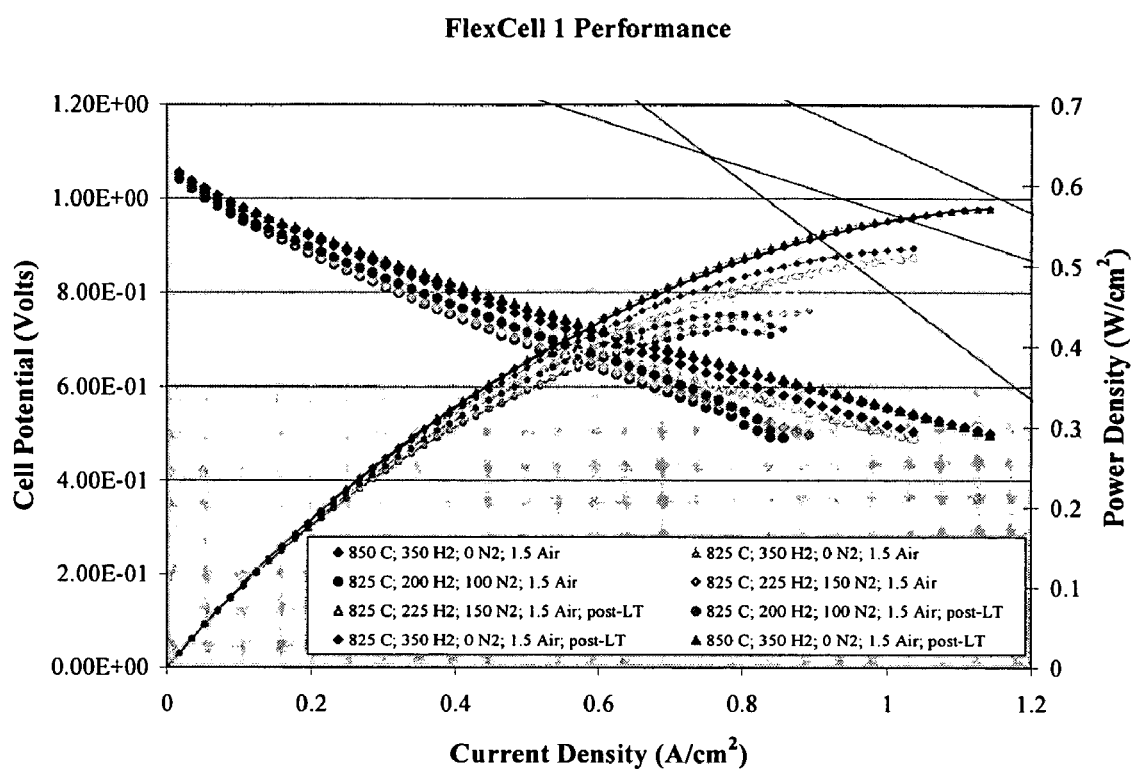
FIG. 11 is a graph of the pre- and post-lifetime test VIR curves for the test cell.
Figure 12:
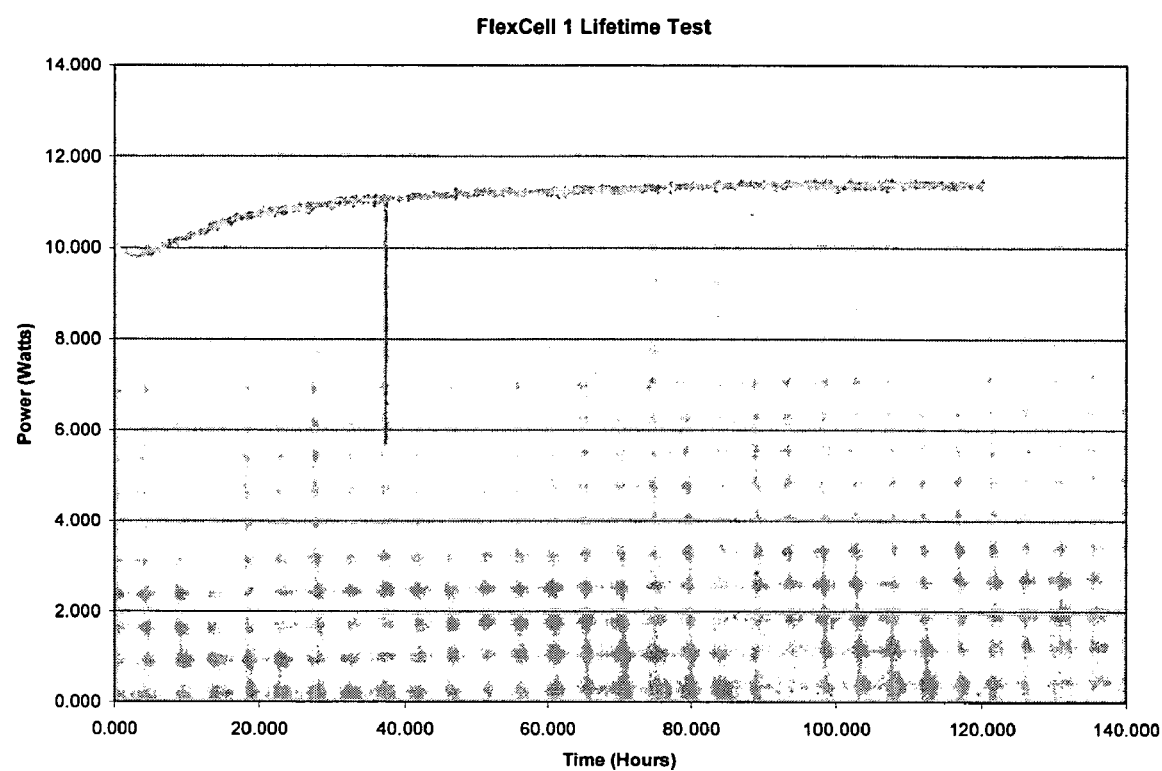
FIG. 12 is a lifetime power plot for the test cell.

After the initial performance tests were completed, the cell was left at 825° C. with 225 sccm $H_2$ and 150 sccm $N_2$ on the anode and 1.5 slpm air on the cathode. The cell was then set to a constant voltage of 0.70V for a test of performance over time ("lifetime test"). The cell showed a slight improvement in performance during the 120+ hours it was on test, as shown in FIG. 12. At the end of 120 hours, the same four voltage vs. current density measurements were repeated. These curves also are shown in FIG. 11. The ASR of the cell was calculated as shown in Table 2.

TABLE 2

| Temp (° C.) | $H_2$ Flow (sccm) | $N_2$ Flow (sccm) | Air Flow (slpm) | Current at 0.5 V (A) | ASR |
|---|---|---|---|---|---|
| 850 | 350 | 0 | 1.5 | 32.0 | 0.49 |
| 825 | 350 | 0 | 1.5 | 29.0 | 0.56 |
| 825 | 200 | 100 | 1.5 | 23.8 | 0.59 |
| 825# | 225 | 150 | 1.5 | 26.0 | 0.52 |

The preferred embodiment of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention which is described by the following claims.

What is claimed is:

1. A stack of electrolyte-supported electrochemical cells, comprising:
   at least two electrochemical cells, each electrochemical cell comprising
      a self-supporting thin-film sintered ceramic membrane having
         a thin layer of a sintered ceramic electrolyte material, and
         a thicker layer of a sintered ceramic electrolyte material adjacent to and supporting the thin layer of ceramic electrolyte material, the thicker layer of ceramic electrolyte material comprising a network of interconnected support ribs separating a plurality of voids that extend through the thicker layer of ceramic electrolyte material, the network of interconnected support ribs centrally located to define an integral central mesh portion,
         wherein the thickness of the thin layer is 25 to 50 microns, and each of the thin and thicker layers extends outwardly beyond the central mesh portion to define a dense sealing perimeter around the central mesh portion, the sealing perimeter having the combined thickness of the thin and thicker layers;
      an anode material applied to a surface of the ceramic membrane, and
      a cathode material applied to the opposing surface of the ceramic membrane;
   one or more dense electronically conductive plates, wherein one of said plates is sealed between and to the dense sealing perimeters of the ceramic membranes of adjacent electrochemical cells.

2. The electrochemical cell stack of claim 1, wherein each of the thin layer of ceramic electrolyte material and the thicker layer of ceramic electrolyte material comprises a stabilized zirconia composition.

3. The electrochemical cell stack of claim 1, wherein each of the thin layer of ceramic electrolyte material and the thicker layer of ceramic electrolyte material comprises a partially stabilized zirconia composition.

4. The electrochemical cell stack of claim 1, wherein each of the thin layer of ceramic electrolyte material and the thicker layer of ceramic electrolyte material comprises a scandia-stabilized zirconia composition.

5. The electrochemical cell stack of claim 1, wherein each of the thin layer of ceramic electrolyte material and the thicker layer of ceramic electrolyte material comprises a 6 mol % scandia-stabilized zirconia composition.

6. The electrochemical cell stack of claim 1, wherein the thicker layer of ceramic electrolyte material comprises at least two sheets of a ceramic electrolyte material.

7. The electrochemical cell stack of claim 1, wherein the anode material comprises a composite NiO/Gd-doped cerium oxide and the cathode material comprises a Sr-doped lanthanum manganite/Gd-doped ceria composite, a doped lanthanum ferrite composite, or a mixture thereof.

8. The electrochemical cell stack of claim 1,
wherein each plate comprises chrome superalloy, a ferritic stainless steel, or a lanthanum chromite.

9. The electrochemical cell stack of claim 8, wherein the anode material comprises a composite NiO/Gd-doped cerium oxide and the cathode material comprises a Sr-doped lanthanum manganite/Gd-doped ceria composite, a doped lanthanum ferrite composite, or a mixture thereof.

10. The electrochemical cell stack of claim 1, comprising:
n said electrochemical cells, wherein n>2; and
n+1 said dense electronically conductive plates, each comprising a nickel chrome superalloy, a ferritic stainless steel, or a lanthanum chromite;
wherein each of n−1 plates is secured between electrochemical cells and each of the remaining two plates is secured to an outer surface of one of the outermost of the n electrochemical cells.

11. The electrochemical cell stack of claim 10, wherein the anode material comprises a composite NiO/Gd-doped cerium oxide and the cathode material comprises a Sr-doped lanthanum manganite/Gd-doped ceria composite, a doped lanthanum ferrite composite, or a mixture thereof.

12. The electrochemical cell stack of claim 1, wherein the width of the dense sealing perimeter is greater than the width of said support ribs.

13. The electrochemical cell stack of claim 1, wherein said voids have a hexagonal shape.

14. A method of making the stack of electrolyte-supported electrochemical cells of claim 1, the method comprising the steps of:
making each of said at least two electrochemical cells by
-providing a thin layer of green ceramic electrolyte material,
-providing a thicker layer of green ceramic electrolyte material, the thicker layer of green ceramic electrolyte material comprising a network of interconnected support ribs separating a plurality of voids that extend through the thicker layer of green ceramic electrolyte material, the network of interconnected support ribs centrally located to define an integral central mesh portion,
-laminating the thin layer to the thicker layer such that each of the thin and thicker layers extends outwardly beyond the central mesh portion to define a dense sealing perimeter around the central mesh portion, the sealing perimeter having the combined thickness of the thin and thicker layers,
-sintering the laminated layers to form a self-supporting thin-film ceramic membrane,
-applying an anode material to a surface of the ceramic membrane,
-applying a cathode material to the opposing surface of the ceramic membrane; stacking said at least two electrochemical cells, with one of said dense electronically conductive plates between adjacent electrochemical cells; and
sealing said plates between and to the dense sealing perimeters of the ceramic membranes of adjacent electrochemical cells.

\* \* \* \* \*